United States Patent

[11] 3,620,455

[72] Inventor William W. Berry
Pittsburgh, Pa.
[21] Appl. No. 44,931
[22] Filed June 10, 1970
[45] Patented Nov. 16, 1971
[73] Assignee Berry Metal Company
Harmony, Pa.
Continuation-in-part of application Ser. No. 770,968, Oct. 28, 1968, now abandoned. This application June 10, 1970, Ser. No. 44,931

[54] EASILY REPAIRABLE GAS INJECTION LANCE
21 Claims, 13 Drawing Figs.
[52] U.S. Cl. .................................................. 239/132.3,
239/423, 266/34
[51] Int. Cl. ............................................................ B05b 15/00
[50] Field of Search ................................................. 266/34;
239/132.3, 423

[56] References Cited
UNITED STATES PATENTS

| | | | |
|---|---|---|---|
| 3,170,977 | 2/1965 | Obenchain | 239/132.3 X |
| 3,202,201 | 8/1965 | Masella et al. | 239/132.3 |
| 3,224,679 | 12/1965 | Kear et al. | 239/132.3 |
| 3,339,616 | 9/1967 | Ward, Jr. et al. | 239/132.3 |
| 3,346,190 | 10/1967 | Shepherd | 239/132.3 |
| 3,387,784 | 6/1968 | Ward, Jr. | 239/132.3 |
| 3,439,911 | 4/1969 | Barnard et al. | 239/132.3 X |

Primary Examiner—Lloyd L. King
Attorney—Hyman F. Glass

ABSTRACT: A gas lance for oxygen or for a mixture of oxygen and fuel, including a lance top adapter assembly, a nozzle head and three or four concentrically positioned pipes wherein mixing of the oxygen and any other fluids are prevented, except that where fuel fluid is used, the oxygen and fuel fluids are mixed in the nozzle ejection chambers, and wherein there is included, in the lance top adapter assembly, safety means for venting to the atmosphere any leaking oxygen and oxygen-containing mixtures. The lance top adapter assembly includes the combination of a bushing member, a piston sleeve and a bushing sleeve and also includes means for sealing the piston sleeve and the bushing member, means for sealing the bushing sleeve and the piston sleeve, and means for sealing the bushing sleeve and quick disconnect means for quickly and easily removing the lance top adapter assembly from the oxygen lance, all against the flow of fluid or any combination of fluids therebetween. Said sealing means include O-ring structures. The bushing sleeve is easily removed and interchangeable and can be easily removed and replaced or repaired when any scoring occurs in any slip joint or sealing means. The structure is such that oxygen and any other fluid cannot be mixed within the lance proper for the reason that any other fluid, should there be leakage thereof, will first pass to the atmosphere at negative pressure before it will flow into the oxygen channels under positive pressure and also for the reason that the oxygen, should there be leakage thereof, will first pass to the atmosphere at negative pressure before it will pass into any other fluid within the lance proper under positive pressure.

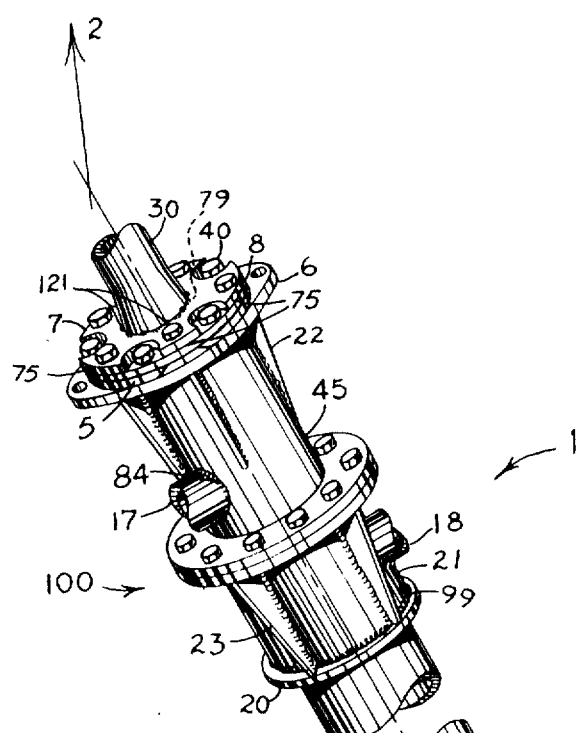
FIG. 1
INVENTOR
WILLIAM W. BERRY
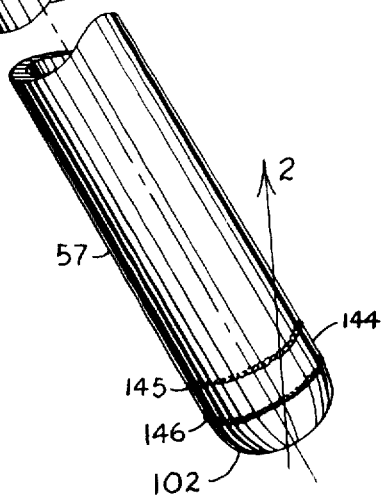
BY
ATTORNEY

INVENTOR
WILLIAM W. BERRY
BY
ATTORNEY

INVENTOR
WILLIAM W. BERRY

BY
ATTORNEY

INVENTOR
WILLIAM W. BERRY
BY
ATTORNEY

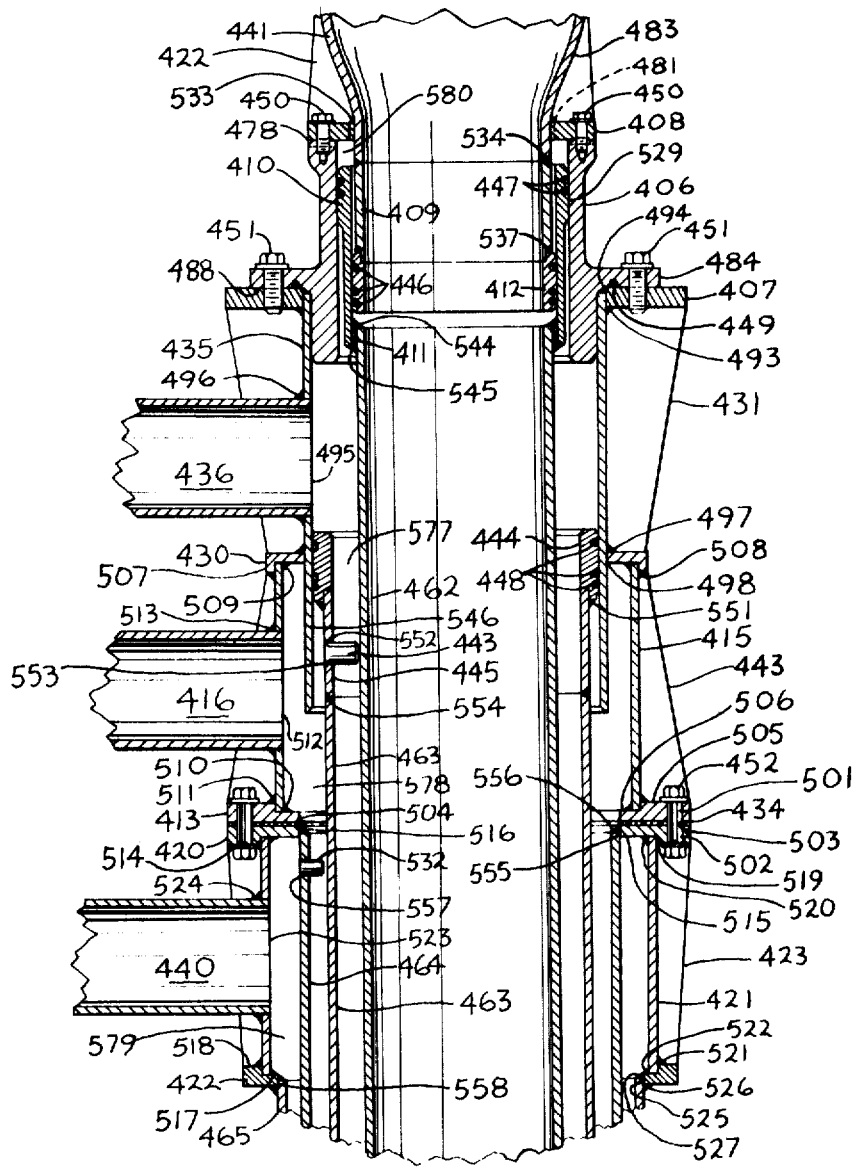
FIG. 7
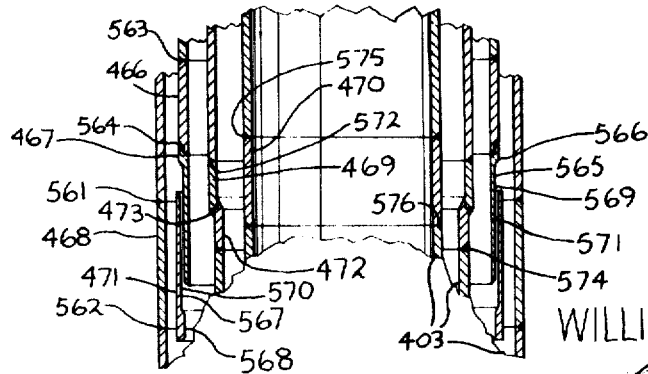
INVENTOR
WILLIAM W. BERRY
BY
ATTORNEY

INVENTOR
WILLIAM W. BERRY
BY
ATTORNEY

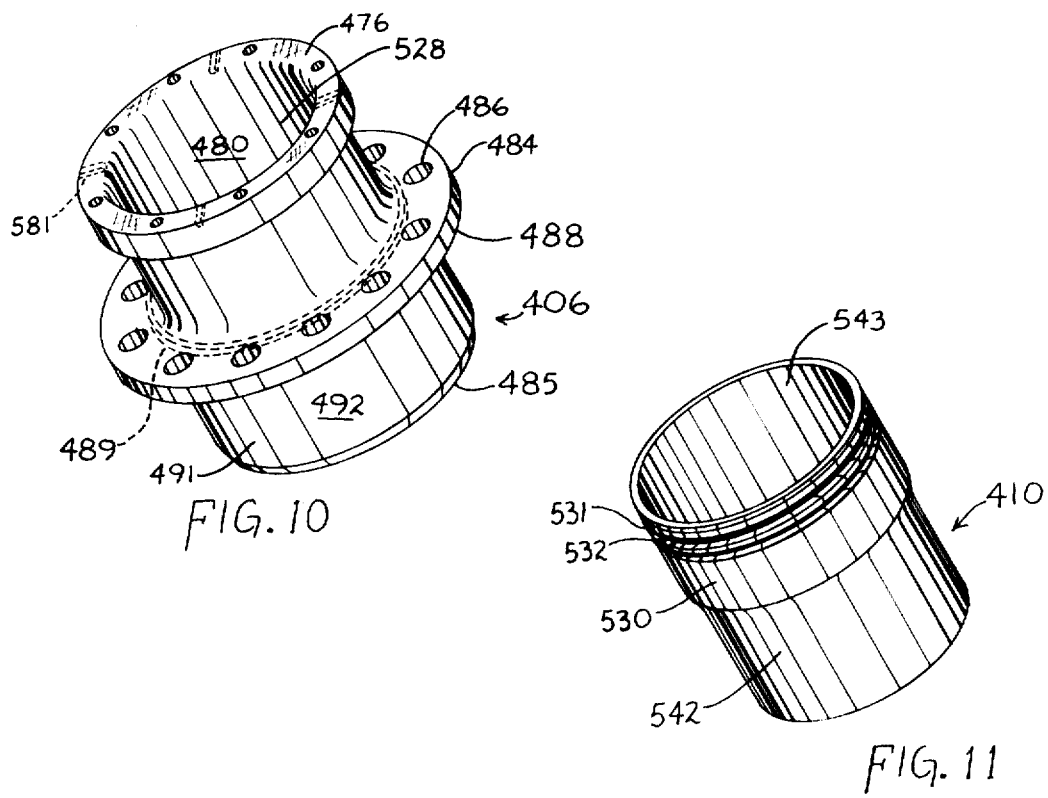
FIG. 10
FIG. 11
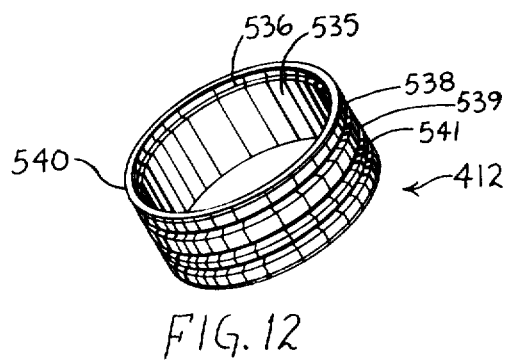
FIG. 12
INVENTOR
WILLIAM W. BERRY
BY
ATTORNEY

3,620,455

EASILY REPAIRABLE GAS INJECTION LANCE

This application is a continuation-in-part of my application, Ser. No. 770,968 filed on Oct. 28,1968.

BACKGROUND OF THE INVENTION

1. Field of the Invention

This invention relates to gas injection lances such as oxygen injection lances and oxygen-fuel injection lances for introducing oxygen gas and a mixture of oxygen gas and fuel gas simultaneously, respectively, into open hearth furnaces or basic oxygen furnaces.

More particularly, this invention, in one embodiment, relates to such improved oxygen injection lances which can be easily repaired, particularly with respect to the lance top adapter assembly portion thereof, and which include means for preventing entrainment of cooling fluid in the oxygen within the lance and which include, in addition to the lance top adapter assembly portion, a nozzle head and three concentrically positioned pipes, each operatively connected to said adapter assembly and to said nozzle head. The oxygen injection lances have such structural features that the oxygen cannot pass or leak into the coolant gas or water channels for the reason that such oxygen first passes or leaks to the atmosphere at negative pressure prior to passing or leaking into the coolant gas or water channels under positive pressure. Also, coolant gas or water cannot pass or leak into the oxygen channels for the reason that such coolant first passes or leaks to the atmosphere prior to passing or leaking into the oxygen channels under positive pressure. Furthermore, the oxygen injection lances of this embodiment are of such construction that the centrally positioned and intermediately positioned pipes of said three concentrically positioned pipes are axially movable independently of each other and of the outer pipe of said three pipes. The lance top adapter assembly portion of the oxygen injection lance embodiment is further of such construction that it can be easily and quickly disconnected and removed and includes an easily removable and interchangeable and repairable, if necessary, bushing or bushing sleeve, preferably of a bronze, such as a cast bronze, and also an easily removable and interchangeable and separable, if necessary, bushing member, preferably of a bronze, such as an aluminum bronze, when any scoring occurs in any slip joint or sealing means in said adapter assembly. In addition, the lance top adapter assembly portion has such structural features that all parts thereof are interchangeable and oversize O-ring pistons are never required, thereby keeping maintenance and repair time at a minimum with assurance that the lances will not be tied up for reboring and additional remachining of oversize parts. Changes in temperature occurring in and about the oxygen lances of this embodiment will not cause distortion of the various portions thereof for the reason that the structural characteristics are such that said central and intermediate pipes move independently of each other and of said outer pipe. The sealing means utilized include O-rings of well-known nonmetallic compressible materials, and the structural characteristics of the component parts of said adapter assembly are such that there is a double-piston effect involving the bushing member, the piston sleeve, preferably of stainless steel, and the bushing sleeve in combination with which are utilized the sealing O-ring members, thereby making for a 100 percent safety factor against leakage or passage of coolant gas or water and oxygen with the zero pressure side of each sealing means being vented to atmosphere through vent holes, face-to-face roughened surfaces, check valves, and the like.

More particularly, this invention in another embodiment, relates to such improved oxygen-fuel injection lances for introducing oxygen gas and fuel gas simultaneously into open hearth furnaces or basic oxygen furnaces without any mixing of the oxygen and fuel anywhere in the lance except in the nozzle ejecting chambers. Also, the oxyfuel lances of this embodiment are of such structural features that the coolant fluid is prevented from mixing with the oxygen and fuel gases anywhere in the lances. Likewise oxygen-fuel lances of this embodiment can be easily repaired particularly with respect to the lance top adapter assembly portion thereof and include means for preventing mixing of the oxygen gas and fuel gas therewithin except as heretofore stated, thereby preventing explosions particularly within the lance top adapter assembly portion thereof, and also for preventing mixing of the cooling fluid with the oxygen gas or the fuel gas or with both the oxygen gas and fuel gas anywhere therewithin. The lances of this embodiment have such structural features that oxygen gas cannot pass or leak into the fuel gas channels for the reason that the oxygen first passes to the atmosphere at negative pressure prior to passing into the fuel gas channels under positive pressure. Also, the fuel gas cannot pass into the oxygen channels for the reason that said fuel gas first passes to the atmosphere prior to passing or leaking into the oxygen channels under positive pressure. The lances of this embodiment also include, in addition to the lance top adapter assembly portion, a nozzle head and four concentrically positioned pipes, each operatively connected to said adapter assembly and to said nozzle head and are of such construction that the centrally positioned and second and intermediate pipes are movable independently of each other and of the outer pipe of said four pipes. The lance top adapter assembly portion of the oxygen-fuel injection lances of this invention is further of such construction that it can be easily and quickly disconnected and removed and includes an easily removable and interchangeable and repairable, if necessary, bushing sleeve, preferably of a bronze, such as a cast bronze, and also an easily removable and interchangeable and separable, if necessary, first bushing member, or bushing sleeve, preferably of a bronze, such as an aluminum bronze, and another or second easily removable, and interchangeable and separable, if necessary, bushing member likewise preferably of a bronze, such as an aluminum bronze, when scoring occurs in any slip joint or sealing means in said adapter assembly. In addition, the lance top adapter assembly portion of this embodiment likewise has such structural features that all parts thereof are interchangeable and oversize O-ring pistons are never required, thereby keeping maintenance and repair time at a minimum with assurance that the lances will not be tied up for reboring and additional remachining of oversize parts. Thusly, not only are the oxyfuel lances of this embodiment such that mixing of the oxygen and fuel gases mix only in the nozzle ejecting chambers but are also such that its lance top adapter assembly portion likewise can be easily repaired. Changes in temperature in and about the lances of this embodiment do not and will not cause distortion of the various portions thereof for the reason that the structural characteristics are such that the centrally positioned and second and intermediate pipes are movable independently of each other and of the outer pipe of said four pipes of the lance. The sealing means utilized in this embodiment likewise include O-rings of well-known nonmetallic compressible materials, and the structural characteristics of the component parts of said adapter assembly are such that there is the combination of, first, a double piston effect involving the first bushing member, the piston sleeve, preferably of stainless steel, and the bushing sleeve and, second, a single piston effect involving the second-bushing member, and the pipe-connecting body, preferably of stainless steel, said second-bushing member being connected to the second pipe member of said four concentrically positioned pipes of the lance body. In combination with the first bushing member, the piston sleeve and bushing sleeve are utilized sealing O-ring members, thereby making for a 100 percent safety factor against leakage or passage of fuel gas and oxygen gas with the zero pressure side of each sealing means being vented to atmosphere through vent holes, face-to-face roughened surfaces, check valves and the like. Also, in this embodiment, in combination with the second bushing member and the pipe-connecting body, preferably of stainless steel, are likewise utilized sealing O-ring members.

2. Description of the Prior Art

Prior art lances, as presently known, are disclosed in such U.S. patents as the Berry Pat. Nos. 3,043,577 and 3,118,608, the Obenchain Pat. No. 3,170,977, the Berry Pat. No. 3,224,749, the Masella et al. Pat. No. 3,202,201, the Kear et al. Pat. No. 3,224,679, the Shepherd Pat. No. 3,346,190, the Vonnemann Pat. No. 3,322,348, the Hutton Pat. No. 3,304,009, the Ward, Jr., et al. Pat. No. 3,339,616, the Ward, Jr., Pat. No. 3,387,784 and the Barnard et al. Pat. No. 3,439,911.

In the prior art oxygen injection lances wherein there has been utilized a slip joint structure in the lance top adapter assembly portion, for example, the Obenchain, Berry and Shepherd patents, supra, a single slip joint only has been used and disclosed. There is not disclosed by or used in the prior art lances any easily separable basic oxygen furnace oxygen injection lance with any lance top adapter assembly having a combination of component parts constituting a double-piston or double-slip joint together with safety means for venting to the atmosphere in the adapter assembly portion whereby there is prevented entrainment of cooling fluid in the oxygen within the lance.

In the prior art oxygen-fuel lances there are not disclosed any easily repairable means in the lance top adapter portion including means for preventing mixing of the fuel gas and the oxygen gas therewithin, and especially in the lance top adapter portion, except in the nozzle ejection chambers thereof. Also, there is not disclosed by the prior art any easily separable and repairable oxyfuel injection lance with any lance top adapter portion assembly having a combination of component parts constituting a double-piston or double-slip joint together with safety means for venting to the atmosphere in the adapter assembly portion whereby there is prevented entrainment of fuel gas in the oxygen gas together with a combination of component parts constituting a single piston or slip joint for preventing mixing of the gas and the coolant.

In the prior art lances the primary and only function of the single slip joints therein is to prevent distortion, and welded joints are used to prevent mixing of the coolant and oxygen gas.

SUMMARY OF THE INVENTION

The lances of this invention are easily repairable.

The oxygen injection lances include means for preventing entrainment of coolant fluid in the oxygen within the lance. In the lances of this embodiment of the invention, the oxygen cannot leak or pass into coolant gas or water channels because it first passes or leaks to the atmosphere at negative pressure prior to passing into the coolant channels under positive pressure, and the coolant cannot pass or leak into the oxygen channels because it first passes or leaks to the atmosphere at negative pressure prior to passing or leaking into oxygen channels under positive pressure. The oxygen injection lance of this embodiment comprises a lance top adapter assembly, a nozzle head and three concentrically positioned pipes including a centrally positioned pipe, an intermediate pipe and an outer pipe, each of the pipes being operatively connected to the adapter assembly and to the nozzle head. The adapter assembly includes a bushing member axially spaced apart from the centrally positioned pipe, a bushing sleeve laterally spaced apart from the bushing member, a piston sleeve positioned between and in slideable engagement with the bushing member and the bushing sleeve, means for sealing the piston sleeve and the bushing member against the flow of fluid therebetween, means for sealing the bushing sleeve and the piston sleeve against the flow of fluid therebetween, quick disconnect means for quickly and easily removing the adapter assembly from the lance, means for sealing the bushing sleeve and the quick disconnect means against the flow of fluid therebetween, and safety means for venting to the atmosphere any leaking cooling fluid, oxygen, or cooling fluid entrained in the oxygen. The oxygen injection lances of this embodiment are such that there is not any leakage of the oxygen to the water coolant or of the water coolant to the oxygen. In other words, there is vented to the atmosphere, in the event of any leakage, the oxygen, cooling fluid or cooling fluid entrained in the oxygen on the zero pressure side of the sealing means for said piston sleeve and said bushing member and of the sealing means for said bushing sleeve and said piston sleeve. Also, distortion of the respective pipes is prevented.

The oxygen-fuel, or oxyfuel, lances include means for preventing mixing of fuel gas and oxygen gas, or the entrainment of the fuel gas in the oxygen gas, therewithin except in the nozzle ejection chambers thereof. Further, the lances of this embodiment include means for preventing mixing of the oxygen gas or fuel gas with the cooling fluid in all portions thereof, with the result that mixing of the fuel gas, oxygen gas and coolant is prevented. In the oxyfuel lances of this invention the oxygen cannot leak or pass into the fuel gas because it first passes or leaks to the atmosphere at negative pressure prior to passing into the fuel gas channels under positive pressure, and the fuel gas cannot pass or leak into the oxygen channels because it first passes or leaks to the atmosphere at negative pressure prior to passing into oxygen channels under positive pressure, except, of course, in the nozzle ejection chambers thereof, wherein there is the desired early combination of the oxygen gas and fuel gas. The oxygen-fuel, or oxyfuel, of this embodiment likewise comprises a lance top adapter assembly, and a nozzle head and four concentrically positioned pipes including a centrally positioned pipe, a second pipe, an intermediate pipe and an outer pipe, each of the pipes being operatively connected to the adapter assembly and to the nozzle head. The adapter assembly includes a first bushing member axially spaced apart from the centrally positioned pipe, a bushing sleeve laterally spaced apart from said first bushing member, a piston sleeve positioned between and in slideable engagement with said first bushing member and said bushing sleeve, means for sealing the piston sleeve and the bushing sleeve against the flow of fluid therebetween, means for sealing the first bushing member and the piston sleeve against the flow of fluid therebetween, quick disconnect means for quickly and easily removing the adapter assembly from the lance, a second bushing axially spaced apart from said bushing sleeve and in slidable engagement with at least a portion of the pipe body member of the quick disconnect means, which pipe body member is adjacent to at least a portion of the bushing sleeve, said second bushing member being laterally spaced apart from the centrally positioned pipe and connected to said second pipe, means for sealing the second bushing member and the pipe body member of the quick disconnect means against the flow of fluid therebetween, means for sealing the bushing sleeve and the quick disconnect means against the flow of fluid therebetween, and safety means in the lance top adapter portion for venting to the atmosphere any leaking oxygen gas, fuel gas or fuel gas entrained in the oxygen gas. Also, in the oxyfuel lances of this embodiment, the structural features are such that there is not any leakage of the oxygen gas or of the fuel gas to the water coolant or of the water coolant to the oxygen gas or to the fuel gas. Now, with respect to the safety means, as aforesaid, there is vented to the atmosphere, in the event of any leakage in the lance top adapter portion, the oxygen gas, the fuel gas or fuel gas entrained in the oxygen gas on the zero pressure side of the sealing means for said piston sleeve and said first bushing member and of the sealing means for said bushing sleeve and said piston sleeve. Likewise, distortion of the respective pipes is prevented.

One of the objects of this invention is to provide an easily repairable oxygen injection lance having a double-slip joint structure in the lance top adapter portion and safety means for venting to the atmosphere any leaking cooling fluid, oxygen or cooling fluid entrained in the oxygen whereby distortion of lance component pipes because of temperature changes is prevented and whereby entrainment of cooling fluid in the oxygen within the lance is prevented.

Another object of this invention is to provide an easily repairable oxygen-fuel, or oxyfuel, injection lance having a double-slip joint structure in the lance top adapter portion and safety means for venting to the atmosphere any leaking oxygen, fuel fluid or fuel fluid entrained in the oxygen for preventing any mixing of the oxygen and fuel in the lance top adapter portion and safety means for venting to the atmosphere any leaking oxygen, fuel fluid or fuel fluid entrained in the oxygen, said lance also having a slip joint structure for preventing the mixing of the fuel gas and the water in the lance top adapter portion, whereby explosions caused by mixing of oxygen and fuel fluid are prevented in the lance top adapter portion, whereby distortion of the lance component pipes because of temperature changes is prevented and whereby mixing of the fuel fluid, oxygen gas and cooling fluid is prevented in the lance top adapter portion.

Other objects and features will be readily apparent from the following detailed description which is not limiting but only illustrative of the preferred embodiments of this invention.

BRIEF DESCRIPTION OF THE DRAWINGS

FIG. 1 is a perspective view of one embodiment of the gas injection lance of this invention.

FIG. 7 is a longitudinal cross-sectional view taken on line 7—7 of FIG. 6, with the fuel gas inlet, water inlet and water outlet rotated out of the location, as shown in FIG. 6, for purposes of clarity.

FIG. 10 is a perspective view of another component part of the lance of the embodiment of FIGS. 6 and 7.

FIG. 11 is a perspective view of another component part of the lance of the embodiment of FIGS. 6 and 7.

FIG. 12 is a perspective view of another component part of the lance of the embodiment of FIGS. 6 and 7.

DESCRIPTION OF THE PREFERRED EMBODIMENTS

Figure 2:
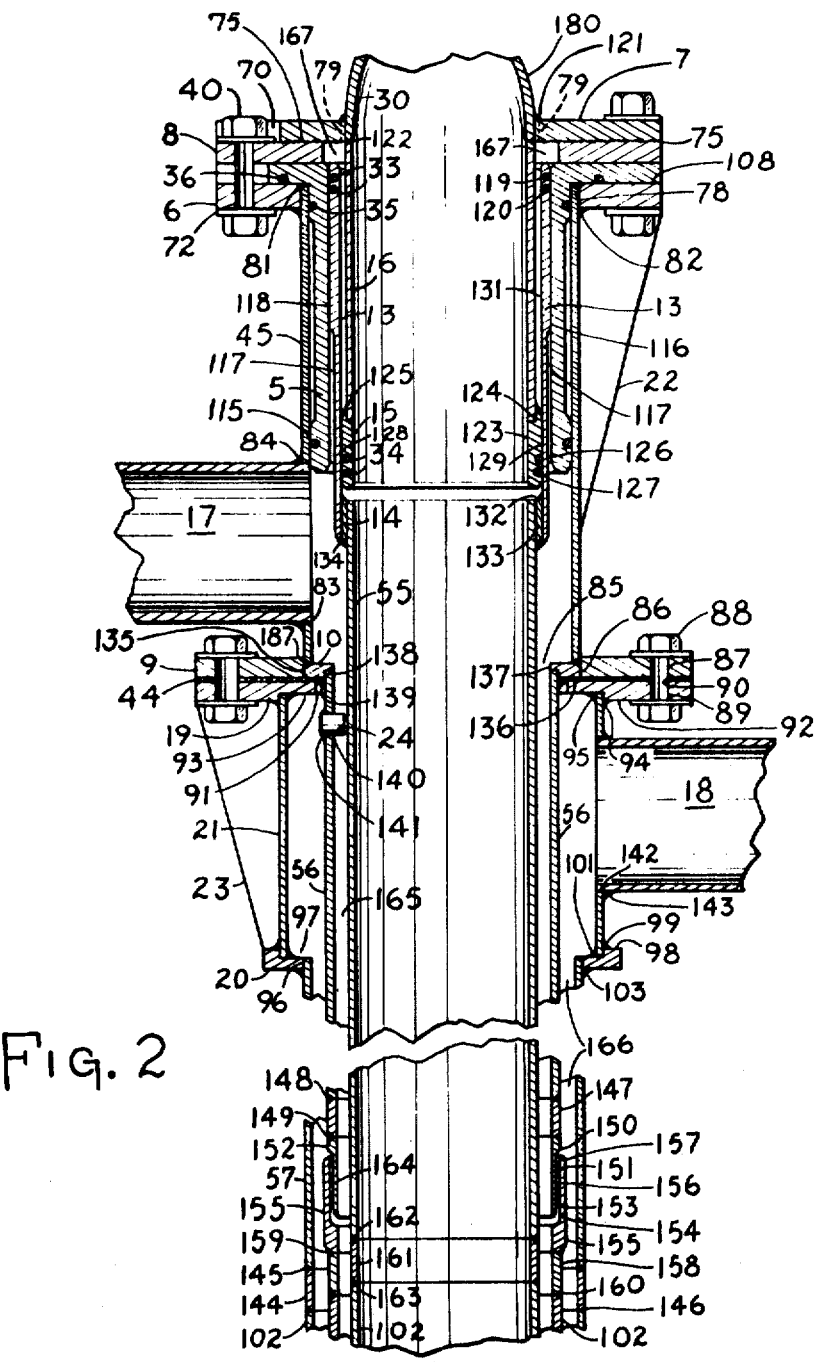
FIG. 2 is a longitudinal cross-sectional view taken on line 2—2 of FIG. 1.

Elements or groups of elements which are conventional and generally widely known in the field to which the oxygen injection lance of this invention relates of course form a part of the lance of this invention herein described, and their exact nature or type is not here described in detail for the reason that persons skilled in the art can understand and use the oxygen injection lance of this invention without a detailed recitation of such conventional and generally widely known elements or groups of elements.

I. THE OXYGEN INJECTION LANCE OF FIGS. 1–5, INCLUSIVE

More particularly, the oxygen injection lance 1, one preferred embodiment of this invention, includes lance top adapter assembly 100, nozzle head 102 and three concentrically positioned pipes, namely, centrally positioned pipe 55, intermediate pipe 56, and outer pipe 57. Nozzle head 102 is preferably an oxygen injection lance nozzle such as disclosed in the Walter V. Berry U.S. Pat. No. 3,430,939 granted on Mar. 4, 1969. However, such nozzle heads as disclosed in U.S. Pat. Nos. 3,065,916, 3,322,348 and 3,304,009 can also be used as can other generally widely known and conventional nozzle heads.

Lance top adapter assembly 100 includes upper plate member 7, center plate member 8, lower plate member 6, bolt and nut and lockwasher combinations 40, connecting pipe body member 45, water inlet pipe member 17, bushing sleeve 5, piston sleeve 13, bushing member 15, O-ring members 33, 33, 34, 34, 35, 36, pipe space connector 14, pipe sleeve member 16, pipe reducer member 30, base plate member 9, retainer plate member 10, quick disconnect plate member 19, connector pipe body member 21, bottom plate member 20, and pipe member 18.

Upper plate member 7 has radially spaced apart preferably arcuately shaped slots 70 at its outer periphery, as clearly shown in the appended drawings, for enabling the positioning of each bolt of the bolt, nut and lockwasher combinations 40 in and through radially spaced-apart openings 71 in center plate member 8 and radially spaced apart openings 72 in and through lower plate member 6. The bottom surface 73 of upper plate member 7 is roughened as is the top surface 74 of center plate member 8 to form in the assembly venting passage 75 between said roughened surfaces 73 and 74 of plate members 7 and 8, respectively. In and through upper plate member 7 is centrally positioned opening 76; in and through center plate member 8 is centrally positioned opening 77; and in and through lower plate member 6 is centrally positioned opening 78. Instead of venting passage 75 between plate members 7 and 8, there can be radially spaced-apart slots 79 (shown by dotted lines) in and through plate 7 at the edge portion 80 of opening 76, and such slots with outer surface 180 of pipe reducer member 30 will likewise form venting passages. Also, both slots 79 and venting passage 75 can be utilized. Positioned in and through opening 78 and against plate member 6 is connecting pipe body member 45 joined to plate member 6 by circumferential weld 81 and circumferential weld 82. Connecting pipe body member 45 has opening 83 therein and therethrough, and water inlet pipe 17 is positioned in said opening 83 and joined to body member 45 by circumferential weld 84. Connecting pipe body member 45 is also joined by circumferential weld 187 to base plate member 9 having centrally positioned opening 86 therein and therethrough. Circular retainer plate member 10 has centrally positioned opening 85 therein and therethrough, plate member 10 having a bevelled outer edge, as clearly shown in the appended drawings.

Baseplate member 9 has radially spaced-apart openings 87 therein and therethrough for enabling the positioning of each bolt of the bolt, nut and lockwasher combinations 88 in and through said openings 87 in member 9 and radially spaced-apart openings 89 in and through quick disconnect plate member 19 as well as radially spaced-apart openings 90 in and through circular gasket member 44 in contact with and positioned between members 9 and 19, as clearly shown in the appended drawings. Quick disconnect plate member 19 has centrally positioned opening 91 therein and therethrough. In the bottom surface 92 of member 19 is circumferential recess 93. Connector pipe body member 21 is positioned in said recess 93 and is joined by circumferential welds 94 and 95 to member 19, as clearly shown in the appended drawings. Bottom plate member 20 has centrally positioned opening 96 therein and therethrough and circumferential recess 97 in top surface 98. Connector pipe body member 21 is joined to plate member 20 by circumferential weld 99 and circumferential weld 101, as clearly shown in the appended drawings. Positioned in centrally positioned opening 96 of bottom plate member 20 and in contact therewith is outer pipe 57 joined to member 20 by circumferential weld 103, as clearly shown in the appended drawings. Gusset members 22, between and attached to lower plate member 6 and connecting pipe body member 45, and gusset members 23, between and attached to quick disconnect plate member 19 and bottom plate member 20 and also attached to connector pipe body member 21, are utilized as strengthening members, as clearly shown in the appended drawings.

Bushing sleeve 5 includes flange 104 having curved spaced-apart slot portions 105 and spaced-apart openings 106 therein and therethrough, said openings 106 being in coinciding relationship with openings 71 in and through member 8 and openings 72 in and through member 6 to receive and position each bolt portion of combination 40 when lance top adapter assembly 100 of lance 1 is in assembled condition, and some of said bolt portions are also received and positioned in and through slots 105 of flange 104, as clearly shown in the appended drawings. Bottom surface 107 of flange 104 is positioned against and in contact with top surface 108 of lower plate member 6. Circumferential groove 109 is in bottom surface 107, and positioned in said groove 109 is O-ring member 36. Circular body portion 110 of bushing sleeve 5 has circumferential recess 111 in the intermediate portion of its outer surface 112 and circumferential groove 113, in the upper portion thereof, and circumferential groove 114, in the lower portion thereof. Positioned in groove 113 is O-ring member 35, and positioned in groove 114 is O-ring member 115. Piston sleeve 13 is positioned against and in contact with inner surface 116 of body portion 110 of bushing sleeve 5 and has circumferential recess portion 117 in its outer surface 118. Spaced-apart circumferential grooves 119 and 120 are in the upper portion of outer surface 118 of piston sleeve 13, and O-rings 33, 33 are positioned therein, as clearly shown in the appended drawings.

Positioned in centrally positioned opening 76 of upper plate member 7 and joined thereto by radially spaced-apart skip welds 121 is pipe reducer member 30. Joined to member 30 by circumferential weld 122 is pipe sleeve member 16. Bushing member 15 has in the upper portion of its inner surface 123 circumferential recess 124 to receive the bottom portion of pipe sleeve member 16, and pipe sleeve member 16 is joined to bushing member 15 by circumferential weld 125, as clearly shown in the appended drawings. Circumferentially spaced-apart grooves 126 and 127 are in the outer surface 128 of bushing member 15 positioned against and in contact with inner surface 129 of piston sleeve 13, and positioned in grooves 126 and 127 are O-rings 34, 34, all as clearly shown in the appended drawings. Piston sleeve 13 has circumferential recess 117 in its outer surface 118.

Positioned in contact with and against inner surface 131 of piston sleeve 13 is pipe space connector member 14 joined by circumferential weld 132 to piston sleeve 13, as clearly shown in the appended drawings. Central pipe member 55 is positioned in contact with and against inner surface 133 of member 14, and circumferential weld 134 joins piston sleeve 13, member 14 and central pipe member 55, as clearly shown in the appended drawings.

Retainer plate member 10 is positioned on gasket 44 and has its outer surface 135 against and in contact with baseplate member 9, as clearly shown in the appended drawings. In bottom surface 136 and inner surface 137 of member 10 is circumferential recess 138, and positioned in recess 138 is intermediate pipe member 56 joined to member 10 by circumferential weld 139, as clearly shown in the appended drawings. In and through the wall of member 56 are radially spaced-apart openings 140 in which are positioned safety stop pin members 24 each joined to member 56 by circular weld 141 for preventing pipe member 55 from falling out of lance 1 if for any reason nozzle head 102 be removed or burned off.

In and through connector pipe body member 21 is opening 142 in which is positioned water exit pipe member 18 joined to member 21 by circumferential weld 143.

Joined to outer pipe member 57 is pipe body member 144 by circumferential weld 145, and joined to pipe body member 144 is nozzle head 102 by circumferential weld 146, as clearly shown in the appended drawings.

Joined by circumferential weld 148 to intermediate pipe member 56 is pipe body member 147, and joined by circumferential weld 149 to member 147 is pipe body member 150 having elongated recess 151 in its outer surface 152 to form a sliding fit, or a slip joint, with elongated recess 153 in the inner surface 154 of pipe body member 155, as clearly shown in the appended drawings. The diameter of recessed wall 156 in recess 153 is preferably approximately 0.0625 inch smaller than the diameter of recessed wall 157 in recess 151, thereby making for a difference of preferably approximately 0.0313 inch thereby enabling the formation of the slip joint 164. Pipe body member 155 is joined to pipe body member 158 by circumferential weld 159, and nozzle head 102 is joined to pipe body member 158 by circumferential weld 160, as clearly shown in the appended drawings.

Pipe body member 161 is joined to central pipe 55 by circumferential weld 162, and nozzle head 102 is joined to pipe body member 161 by circumferential weld 163, as clearly shown in the appended drawings.

The quick disconnect means for quickly and easily removing lance top adapter assembly 100 from oxygen lance 1 comprises upper plate member 7, center plate member 8, the bolt, nut and lockwasher combinations 40 and 88, lower plate member 6, connecting pipe body member 45, baseplate member 9, retainer plate member 10, quick disconnect plate member 19, connector pipe body member 21, bottom plate member 20, and gasket member 44, as clearly shown in the appended drawings and herein described.

With respect to lance 1 herein described and clearly shown in the appended drawings, bushing member 15 is axially spaced apart from centrally positioned pipe 55, and bushing sleeve 5 is laterally spaced apart from bushing member 15. Piston sleeve 13, as clearly shown in the appended drawings and as herein described, is positioned between and in slideable engagement with bushing member 15 and bushing sleeve 5. O-ring members 34, 34 are positioned in their respective grooves 126 and 127 and in contact with piston sleeve 13 and act to seal piston sleeve 13 and bushing member 15 against the flow of oxygen gas therebetween. O-ring members 33, 33 are positioned in their respective grooves 119 and 120 and in contact with bushing sleeve 5 and act to seal bushing sleeve 5 and piston sleeve 13 against the flow of coolant fluid therebetween. O-ring member 36 is positioned in its groove 109 and in contact with lower plate member 6; O-ring member 35 is positioned in its groove 113 and O-ring member 115 is positioned in its groove 114, both in contact with connecting pipe body member 45; and said O-ring members 36, 35 and 115 act to seal bushing sleeve 5 and member 45 of the quick disconnect means, and of course the quick disconnect means, against the flow of coolant fluid therebetween.

Bushing member 15 is preferably of aluminum bronze. Piston sleeve 13 is preferably of stainless steel. Bushing sleeve 5 is preferably of cast bronze. Nozzle head 102 is preferably of cast copper.

In use of lance 1 in a basic oxygen furnace, the oxygen gas is passed from lance 1 into the furnace through pipe reducer member 30, pipe sleeve member 16, bushing member 15, centrally positioned pipe 55 and then through the exit ports of nozzle head 102. The coolant fluid water enters lance 1 through water inlet pipe member 17 and passes into annular passageway 165, through nozzle head 102 and then through annular passageway 166 and exits through exit pipe member 18, as is clearly apparent from the appended drawings.

Because of the importance of safety requirements of oxygen flow in a lance, it is most important that all seals in such a lance be inspected each time the lance undergoes repair. As is clearly apparent from the appended drawings and the description herein relating thereto, the lance top adapter assembly 100 can be easily disassembled by removing the combinations 40 and 88 and then of course easily removing upper plate member 7, center plate member 8, baseplate member 9, and quick disconnect plate member 19, among other portions of lance top adapter assembly 100, and then removing the entire assembly 100, of course not necessitating the breaking of the various weld portions, as hereinbefore described, in the removal of the assembly of pipe reducer member 30, pipe sleeve member 16, bushing member 15 and upper plate member 7. Upon disassembly, including the removal of bushing sleeve 5, all O-ring member seals are easily visible and readily available for inspection and replacement, if necessary. In the structure described and shown herein piston sleeve 13 and bushing member 15 act, during use of lance 1, as a double piston combination and form, with the other described components, a double-slip joint. During expansion and contraction, caused by temperature changes, of the various component parts including centrally positioned pipe 55 and member 16, piston sleeve 13 tends to move with respect to bushing sleeve 5, and bushing member 15 and piston sleeve 13 tend to move with respect to each other. Any oxygen leaking between bushing member 15 and piston sleeve 13 past O-ring members 34, 34 passes to annular space 167 and through venting passage 75, or through slots 79, and to the atmosphere. For such leaking oxygen and coolant water to mix the oxygen would have to pass between piston sleeve 13 and bushing sleeve 5 past O-ring members 33, 33. Likewise, coolant water leaking between bushing sleeve 5 and piston sleeve 13 past O-ring members 33, 33 passes to annular space 167 and through venting passage 75, or through slots 79, and to the atmosphere. For such leaking coolant water and oxygen to mix the coolant water would have to pass between bushing member 5 and piston sleeve 13 past O-ring members 34, 34. However, since there is positive pressure on the oxygen side of O-ring members 34, 34 and since there is positive pressure on the coolant water side of the O-ring members 33, 33 and since there is zero pressure therebetween, interchangeable leakage between the coolant water and the oxygen is virtually impossible. In other words, the oxygen cannot leak into the coolant water channels because it passes or leaks to the atmosphere through annular space 167 and venting passage 75, and the coolant water cannot leak into the oxygen channels because it passes or leaks to the atmosphere through annular space 167 and venting passage 75.

As is well known, scoring occurs in any type of a slip joint. Easily removable and interchangeable bushing sleeve 5, preferably of cast bronze, is provided. During expansion and contraction brought about by temperature changes with the attendant movement of piston sleeve 13 caused by the expansion and contraction of centrally positioned pipe 55 scoring of the bushing sleeve could reach a point where leakage past the O-ring members 33 might well occur. As is readily apparent from the description herein and appended drawings, bushing sleeve 5 is easily removed and replaced by a replacement, which is economically more feasible than reboring sleeve 5. Further, as is clearly understandable from the description herein and appended drawings, the lance top adapter assembly 100 has such structural features that all parts thereof are interchangeable, thereby obviating the necessity of having such components as bushing member 15, piston sleeve 13 and bushing sleeve 5 oversize, thereby keeping maintenance and repair time at a minimum and assuring that reboring and remachining of oversize parts are not necessary.

In addition, the presence of slip joint 164 allows for expansion and contraction of intermediate pipe 56 and outer pipe 55 during temperature changes, each being operatively connected with nozzle head 102. For example, upon increase of temperature and accompanying expansion of outer pipe 55, nozzle head 102 moves downwardly with the accompanying movement at slip joint 164. Likewise, slip joint 164 allows for expansion of intermediate pipe 56, all as clearly apparent from the appended drawings.

II. THE OXYGEN-FUEL INJECTION LANCE OF FIGS. 6–13, INCLUSIVE

Also, more particularly, the oxygen-fuel, or oxyfuel, injection lance 401, another preferred embodiment of this invention, includes lance top adapter assembly 402, nozzle head 403 and four concentrically positioned pipes, namely, centrally positioned pipe 462, second pipe 463, intermediate pipe 464, and outer pipe 465. Nozzle head 403 is preferably an oxygen-fuel, or oxyfuel, nozzle head such as one of those disclosed in the Walter V. Berry U.S. Pat. No. 3,043,577. However, other generally known prior art oxyfuel nozzle heads can also be utilized.

Lance top adapter assembly 402 includes top cap plate member 408, upper plate member 407 including the bail lift holes 474, 474, therethrough, bolt and lockwasher combinations 450, connecting pipe body member 435, fuel fluid or gas inlet pipe member 436, connecting pipe body member 415, coolant water inlet pipe member 416, quick disconnect lower plate member 413, quick disconnect upper plate member 420, gasket member 434, bolt and nut and lockwasher combinations 452, connecting pipe body member 421, water outlet pipe member 440, bottom plate member 422, bushing sleeve 406, O-ring member 449, bolt and lockwasher combinations 451, piston sleeve 410, bushing member 412, O-ring members 447, 447, O-ring members 446, 446, 446, pipe space connector 411, pipe sleeve member 409, second bushing member 444, O-ring members 448, 448, 448, and center plate member 430.

Top cap plate member 408 has radially spaced-apart openings 475 therein and therethrough for enabling the positioning of each bolt of the bolt and lockwasher combinations 450 therein and therethrough and into the radially spaced-apart threaded bores in upper surface 476 of bushing sleeve 406, as clearly shown in the appended drawings. The bottom surface 477 of top cap plate member 408 is roughened as is upper surface 476 of bushing sleeve 406 to form, in the assembly, venting passage 478 between said roughened surfaces 476 and 477, respectively. In and through top cap plate member 408 is centrally positioned opening 479; and in and through bushing sleeve 406 is centrally positioned bore 480. Instead of venting passage 478 between top cap plate member 408 and surface 476 of bushing sleeve 406, there can be radially spaced-apart slots 481 (shown by dotted lines) in and through plate member 408 at the edge portion 482 of opening 479, and said slots 481 with outer surface 483 of pipe reducer member 441 will likewise form venting passages. Also, as is readily apparent, slots 481 and venting passage 478 both can be utilized to form composite venting passage means.

Bushing sleeve 406 includes radial flange 484 preferably integral therewith and positioned intermediately between its upper surface 476 and lower surface 485. In and through said flange 484 are radially spaced-apart openings 486 in coinciding relationship with radially spaced-apart openings 487 in and through upper plate member 407. As is clearly shown in the appended drawings, the bolts of the bolt and lockwasher combinations 451 are positioned in and through said respective openings 486 and 487 to hold and lock the respective members in position. In the lower surface 488 of radial flange 484 is circumferential groove 489 to receive O-ring member 449. Upper plate member 407 has therein and therethrough centrally positioned opening 490 to receive therein and therethrough the lower portion 491 of bushing sleeve 406 with its outer surface 492 spaced therefrom. Positioned in centrally positioned opening 490 of upper plate member 407 and against plate member 407 and outer surface 492 of lower portion 491 of bushing sleeve 406 is connecting pipe body member 435 joined to plate member 407 by circumferential weld 493 and circumferential weld 494, as is clearly apparent in the appended drawings. In locked position, the O-ring member is compressed into groove 489 and against the top surface of plate member 407, as is clearly apparent in the appended drawings. Connecting pipe body member 435 has opening 495 therein and therethrough, and fuel gas inlet pipe member 436 is positioned in said opening 495 and joined to body member 435 by circumferential weld 496. Connecting pipe body member 435 is also joined by circumferential weld 497 to center plate member 430, having centrally positioned opening 498 therein and therethrough, as clearly shown in the appended drawings.

Quick disconnect lower plate member 413 has radially spaced-apart openings 501 therein and therethrough for enabling the positioning of each bolt of the bolt, nut and lockwasher combinations 452 in and through said openings 501 in member 413 and radially spaced-apart openings 502 in and through quick disconnect upper plate member 420 as well as radially spaced-apart openings 503 in and through circular gasket member 434 in contact with and positioned between members 413 and 420, as clearly shown in the appended drawings. Quick disconnect lower plate member 413 has centrally positioned opening 504 therein and therethrough. In the top surface 505 of member 413 is circumferential recess 506. Positioned against downwardly extending flange 507 of center plate member 430 and in said recess 506 and in abutment with member 413, as clearly shown in the appended drawings, is connecting pipe body member 415 joined by circumferential welds 508 and 509 to member 430 and by circumferential welds 510 and 511 to member 413. Connecting pipe body member 415 has opening 512 therein and therethrough, and coolant water inlet pipe member 416 is positioned in said opening 512 and joined to body member 415 by circumferential weld 513.

In the bottom surface 514 of quick disconnect upper plate member 420 is circumferential recess 515, and member 420 has centrally positioned opening 516 therein and therethrough. Positioned against member 420 in circumferential recess 515 and against bottom plate member 422, in circumferential recess 517 in the upper surface 518 thereof, is connecting pipe body member 421, as clearly shown in the appended drawings. Circumferential welds 519 and 520 join member 420 to pipe body member 421, and circumferential welds 521 and 522 join member 422 to pipe body member 421, as clearly shown in the appended drawings. Connecting pipe body member 421 has opening 523 therein and therethrough, and coolant water outlet pipe member 440 is positioned in said opening 523 and joined to body member 421 by circumferential weld 524. Bottom plate member 422 has centrally positioned opening 525 therein and therethrough. Positioned in said centrally positioned opening 525 of bottom plate member 422 and in contact therewith is outer pipe 465 joined to member 422 by circumferential welds 526 and 527, as clearly shown in the appended drawings.

Gusset members 442, between and attached to top cap plate member 408 and pipe reducer member 441, and gusset members 431, between and attached to upper plate member 407 and center plate member 430 and also joined to member 435, and gusset members 443, between and attached to center plate member 430 and quick disconnect lower plate member 413 and also joined to body member 415, and gusset members 423, between and attached to quick disconnect upper plate member 420 and bottom plate member 422 and also joined to body member 421, are utilized as strengthening members, as clearly shown in the appended drawings.

Piston sleeve 410 is positioned against and in contact with inner surface 528 of body portion 529 of bushing sleeve 406 and has circumferential recess portion 542 in its outer surface 530. Spaced-apart circumferential grooves 531 and 532 are in the upper portion of outer surface 530, and O-rings 447, 447 are positioned therein, as clearly shown in the appended drawings.

Positioned in centrally positioned opening 479 of top cap plate member 408 and joined thereto by radially spaced apart skip welds 533 is pipe reducer member 441. Joined to member 441 by circumferential weld 534 is pipe sleeve member 409. Bushing member 412 has in the upper portion of its inner surface 535 circumferential recess 536 to receive the bottom portion of pipe sleeve member 409, and pipe sleeve member 409 is joined to bushing member 412 by circumferential weld 537, as clearly shown in the appended drawings. Circumferentially spaced-apart grooves 538, 539 and 541 are in the outer surface 540 of bushing member 412 positioned against and in contact with inner surface 543 of piston sleeve 410, and positioned in grooves 538, 539 and 541 are O-rings 446, 446 and 446, all as clearly shown in the appended drawings.

Positioned in contact with and against inner surface 543 of piston sleeve 410 is pipe space connector 411 joined by circumferential weld 544 to piston sleeve 410 at the lower portion of inner surface 543 thereof and also to central pipe member 462, and circumferential weld 545 joins central pipe member 462 to both pipe space connector 411 and to lowermost edge of piston sleeve 410, all as clearly shown in the appended drawings.

Second bushing member 444 is so positioned that its outer surface 547 is in contact with the inner surface 546 of connecting pipe body member 435. In outer surface 547 of second bushing member 444 are spaced-apart circumferential grooves 548 in which are positioned O-ring members 448, 448, 448 in contact with inner surface 546. In the bottom portion of inner surface 549 of bushing member 444 is circumferential recess 550 in which is positioned tubular member 445, as clearly shown in the appended drawings. Tubular member 445 is joined to bushing member 444 by circumferential weld 551, likewise as clearly shown in the appended drawings. In and through the wall of tubular member 445 are radially spaced apart, preferably circular, openings 552 in and through which are positioned safety stop preferably circular in cross section stop pin members 443 each joined to member 445 by circular weld 553 for preventing pipe member 462 from falling out of lance 401 if for any reason nozzle head 403 be removed or burned off. Joined to tubular member 445 by circumferential weld 554 is second pipe member 463, as clearly shown in the appended drawings.

Positioned in centrally positioned opening 516 of quick disconnect upper plate member 420 is and against and in contact with wall surface 555 of said opening 516 is intermediate pipe 464 joined by circumferential weld 556 to member 420 at said wall surface 555. In and through the wall of pipe 464 are radially spaced apart, preferably circular, openings 557 in and through which are positioned safety stop preferably circular in cross section stop pin members 532 for preventing pipe member 463 from falling out of lance 401 if for any reason nozzle head 403 be removed or burned off.

Positioned in centrally positioned opening 525 of bottom plate member 422 is outer pipe 465 against and in contact with the wall surface 558. Outer pipe 465 is joined to bottom plate member 422 by circumferential weld 526 and circumferential weld 527, as clearly shown in the appended drawings.

Joined to outer pipe member 465 is pipe body member 468 by circumferential weld 561, and joined to pipe body member 468 by circumferential weld 562 is nozzle head 403, as clearly shown in the appended drawings.

Joined by circumferential weld 563 to intermediate pipe member 464 is pipe body member 466, and joined by circumferential weld 564 to pipe body member 466 is pipe body member 467 having elongated recess 565 in its outer surface 566 to form a sliding fit, or a slip joint, with elongated recess 567 in the inner surface 568 of pipe body member 471, as clearly shown in the appended drawings. The diameter of recessed wall 569 in recess 565 is preferably approximately 0.0625 inch smaller than the diameter of recessed wall 570 in recess 567, thereby making for a difference of preferably approximately 0.0313 inch thereby enabling the formation of the slip joint 571.

Pipe body member 469 is joined to second pipe 463 by circumferential weld 572 and to pipe body member 472 by circumferential weld 573. Pipe body member 472 is joined to nozzle head 403 by circumferential weld 576, as clearly shown in the appended drawings.

Pipe body member 470 is joined to central pipe member 462 by circumferential weld 575 and to nozzle head 403 by circumferential weld 576, as clearly shown in the appended drawings.

The quick disconnect means for quickly and easily removing lance top adapter assembly 402 from lance 401 comprises top cap plate member 408, combinations 450, 451 and 452, upper plate member 407, connecting pipe body member 435, center plate member 430, connecting pipe body member 415, lower plate member 413, quick disconnect upper plate member 420, gasket 434, connecting pipe body member 421, and bottom plate member 422.

With respect to lance 401 herein described and clearly shown in the appended drawings, bushing member 412 is axially spaced apart from centrally positioned pipe 462, and bushing sleeve 406 is laterally spaced apart from bushing member 412. Piston sleeve 410, as clearly shown in the appended drawings and as herein described, is positioned between and in slideable arrangement with bushing member 412 and bushing sleeve 406. O-ring members 446, 446, 446, are positioned in their respective grooves 538, 539 and 541 and in contact with piston sleeve 410 and act to seal piston sleeve 410 and bushing member 412 against the flow of oxygen gas therebetween. O-ring members 447, 447 are positioned in their respective grooves 531 and 532 and in contact with bushing sleeve 406 and act to seal bushing sleeve 406 and piston sleeve 410 against the flow of fuel gas therebetween. O-ring member 449 is positioned in its groove 489 and in contact with upper plate member 407. O-ring member 449 acts to seal bushing sleeve and upper plate member 407 against the flow of fuel gas therebetween. Second bushing member 444 is laterally spaced from centrally positioned pipe member 462 and axially spaced from bushing sleeve 406 and is in contact with connecting pipe body member 435, as clearly shown in the appended drawings. O-ring members 448, 448, 448 are positioned in their respective grooves 548, 548, 548 and in contact with connecting pipe body member 435 and act to seal member 444 and connecting pipe body member 435 against the flow of gas and water therebetween. Second bushing member 444 is in slideable arrangement with connecting pipe body member 435, as clearly shown in the appended drawings.

Bushing members 412 and 444 are preferably of aluminum bronze. Piston sleeve 410 is preferably of stainless steel. Bushing member 406 is preferably of cast bronze. Nozzle head 403 is preferably of cast copper.

In the use of lance 401, for example, a basic oxygen furnace, the oxygen gas is passed through pipe reducer member 441, pipe sleeve member 409, first bushing member 412, past an exposed portion of piston sleeve 410, down centrally positioned pipe 462, through pipe body member 470 and into nozzle head 403 wherein it mixes with the fuel gas prior to the occurrence of combustion within the nozzle head ejection chamber. Of course, where no fuel gas is used the oxygen gas passes through the exit ports of nozzle head 403 into the furnace. The fuel gas is passed through inlet pipe member 436 down through annular passageway 577 and into the injection chamber of nozzle head 403. For purposes of this description the nozzle head 403 is the prior art nozzle head fully disclosed and described in Berry U.S. Pat. No. 3,043,577. Coolant water fluid enters lance 401 through inlet pipe member 416 and passes into annular passageway 578, through nozzle head 403 and then through annular passageway 579 and exits through outlet or exit pipe member 440, as is clearly apparent from the appended drawings.

Figure 5:
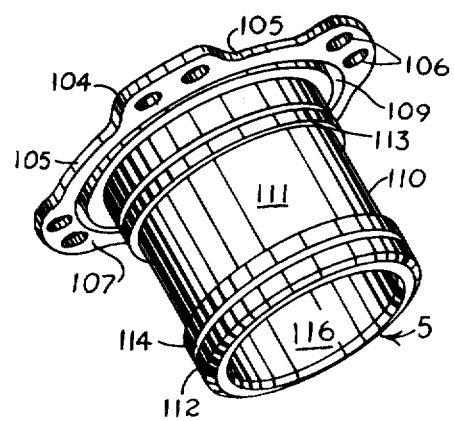
FIG. 5 is a perspective view of another component part of the lance of the embodiment of FIGS. 1 and 2.
Figure 3:
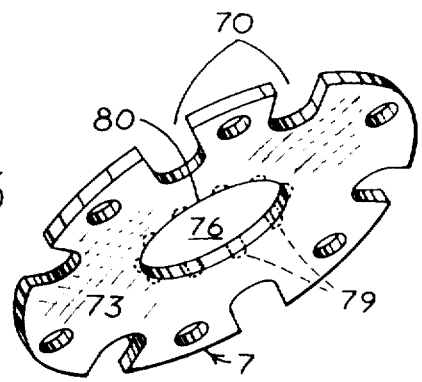
FIG. 3 is a perspective view of a component part of the lance of the embodiment of FIGS. 1 and 2.
Figure 4:
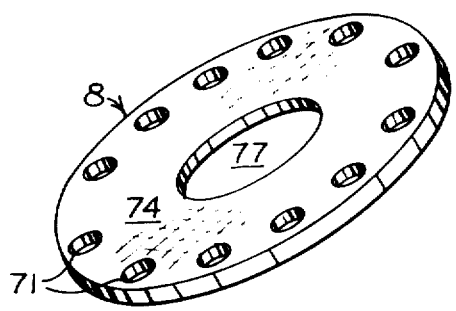
FIG. 4 is a perspective view of another component part of the lance of the embodiment of FIGS. 1 and 2.
Figure 6:
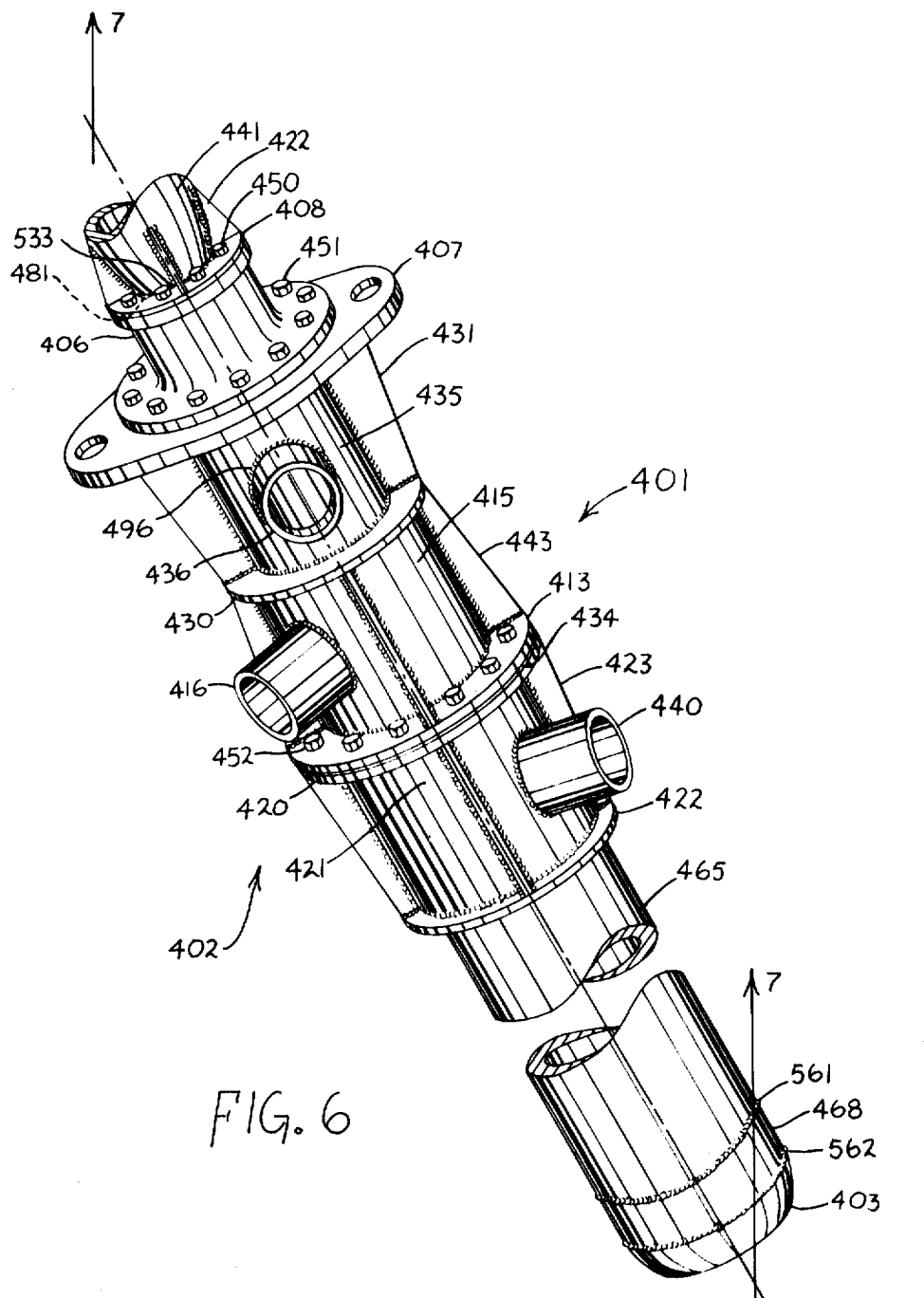
FIG. 6 is a perspective view of another embodiment of the gas injection lance of this invention.
Figure 8:
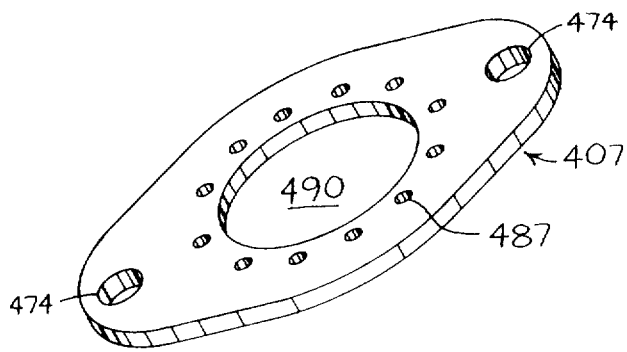
FIG. 8 is a perspective view of a component part of the lance of the embodiment of FIGS. 6 and 7.
Figure 9:
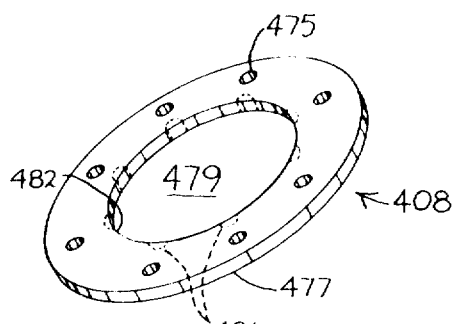
FIG. 9 is a perspective view of another component part of the lance of the embodiment of FIGS. 6 and 7.
Figure 13:
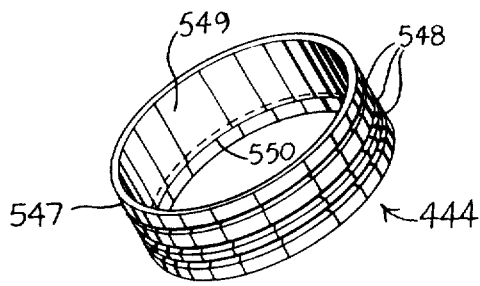
FIG. 13 is a perspective view of another component part of the lance of the embodiment of FIGS. 6 and 7.

Because of the importance of safety requirements of oxygen flow and fuel gas flow, and of course coolant water flow, in such a lance, it is most important that all seals be inspected each time the lance undergoes repair, as hereinbefore stated with respect to the embodiments of FIGS. 1-5, inclusive. As is clearly apparent from the appended drawings and the description herein relating to the embodiment of FIGS. 6-13, inclusive, the lance top adapter assembly 402 can be easily disassembled by removing the combinations 450, 451 and 452 and then of course easily removing top cap plate member 408, bushing sleeve 406, and lower plate member 413, among other portions of assembly 402, and then removing the entire assembly 402, of course not necessitating the breaking of the various weld portions, as hereinbefore described, in the removal of the assembly of pipe reducer member 441, pipe sleeve member 409, first bushing member 412 and top cap plate member 408 and also in the removal of the assembly of upper plate member 407, connecting pipe body member 435, inlet pipe member 436, center plate member 430, connecting pipe body member 415, inlet pipe member 416 and lower plate member 413. Upon disassembly, including the removal of bushing sleeve 406, all O-ring member seals are easily visible and readily available for inspection and replacement, if necessary. Piston sleeve 410 and bushing member 412 act, during use of lance 401, as a double-piston combination and form, with the other components described herein, a double-slip joint. During expansion and contraction, caused by temperature changes, of the various component parts including centrally positioned pipe 462 and member 409, piston sleeve 410 tends to move with respect to bushing sleeve 406, and bushing member 412 and piston sleeve 410 tend to move with respect to each other. Also, bushing member 444 and member 445 and second pipe 463 tend to move with respect to member 435 and also with respect to intermediate pipe 464. Any oxygen leaking between bushing member 412 and piston sleeve 410 past O-ring members 446, 446, 446 passes to annular space 580 and through venting passage 478 or through slots 481, and to the atmosphere. For such leaking oxygen and fuel gas to mix the oxygen would have to pass between piston sleeve 410 and bushing sleeve 406 past O-ring members 447, 447. Likewise fuel gas leaking between bushing sleeve 406 and piston sleeve 410 past O-ring members 447, 447 passes to annular space 580 and through venting passage 478 or through slots 481, and to the atmosphere. For such leaking fuel gas and oxygen to mix, whereby fuel gas is entrained in the oxygen, the fuel gas would have to pass between bushing member 406 and piston sleeve 410 past O-ring members 446, 446, 446. However, since there is positive pressure on the oxygen side of O-ring members 446, 446, 446 and since there is positive pressure on the fuel gas side of the O-ring members 447, 447 and since there is zero pressure therebetween, interchangeable leakage between the fuel gas and oxygen is virtually impossible. In other words, the oxygen cannot leak into the fuel gas channels because it passes or leaks to the atmosphere through annular space 580 and venting passage 478 or slots 481, and the fuel gas cannot leak into the oxygen channels because it passes or leaks to the atmosphere through the annular space 580 and venting passage 478 or slots 481. Furthermore, the mixing of the fuel gas and the water is prevented by the seals formed by O-ring members 448, 448, 448 against and in contact with the member 435, as hereinbefore described, bushing member 444 being positioned in contact and against member 435, as hereinbefore described, and as clearly shown in the appended drawings.

In any type of a slip joint scoring, as is well known, does occur. Easily removable and interchangeable bushing sleeve 406, preferably of cast bronze, is provided. During expansion and contraction brought about by temperature changes with the attendant movement of piston sleeve 410 caused by the expansion and contraction of centrally positioned pipe 462 scoring of the bushing sleeve 406 could reach a point where leakage past O-ring members 447, 447 might well occur. As is readily apparent from the description herein and appended drawings, bushing sleeve 406 is easily removed and replaced by a replacement, which is economically more feasible than reboring bushing. Also, as is clearly understandable from the description herein and the appended drawings, lance top adapter assembly 402 has structural features that all parts thereof are interchangeable, thereby obviating the necessity of having such component parts as bushing member 412, piston sleeve 410, bushing sleeve 406 and bushing member 444 oversize, thereby keeping maintenance and repair time at a minimum and assuring that reboring and remachining of oversize parts are not necessary.

Furthermore, slip joint 571 allows for expansion and contraction of intermediate pipe 464 and outer pipe 465 during temperature changes, each being operatively connected with nozzle head 403. For example, upon increase of temperature and accompanying expansion of outer pipe 465, nozzle head 403 moves downwardly with the accompanying at slip joint 571. In addition, slip joint 571 allows for expansion of intermediate pipe 464, all as clearly apparent from the appended drawings.

With respect to venting passage 478 or slots 481, grooves 581, as particularly shown by the dotted lines in FIGS. 7 and 10, can be utilized instead of said venting passage 478 or slots 481. Such utilization of such grooves 581 obviate the necessity of roughening the respective hereinbefore described surfaces or of forming the hereinbefore described slots 481. Similar grooves can also be used in the embodiment of FIGS. 1 through 5, as hereinbefore described and shown in the appended drawings.

In addition, fuel gas may be introduced into the lance through pipe reducer member 441, pipe sleeve member 409 and then through centrally positioned pipe 462, if desired, while oxygen gas may be introduced into the lance through inlet pipe member 436 and then through annular passageway 577 and through nozzle head 403.

Many alterations and changes may be made without departing from the spirit and scope of this invention which is set forth in the appended claims which are to be construed as broadly as possible in view of the prior art.

I claim:

1. A gas lance for oxygen or a mixture of oxygen and fuel comprising
   a lance top adapter assembly,
   a nozzle head, and
   a plurality of concentrically positioned pipes including at least a centrally positioned pipe and an outer pipe each operatively associated to said lance adapter assembly and to said nozzle head,
   said lance adapter assembly including
   1. a bushing member being spaced apart from said centrally positioned pipe,
   2. a bushing sleeve spaced apart from said bushing member,
   3. a piston sleeve positioned between and in slideable engagement with said bushing member and said bushing sleeve,
   4. means for sealing said piston sleeve and said bushing member against the flow of fluid therebetween,
   5. means for sealing said bushing sleeve and said piston sleeve against the flow of fluid therebetween,
   6. quick disconnect means for quickly and easily removing said lance top assembly from said gas lance,
   7. means for sealing said bushing sleeve and said quick disconnect means against the flow of fluid therebetween,
   8. means for feeding cooling fluid into said lance,
   9. means for feeding oxygen into said lance,
   10. means for exiting return cooling fluid from said lance, whereby at least said centrally positioned pipe is axially movable independently of said outer pipe and whereby mixing of the oxygen fluid and any other fluid, including coolant fluid, is prevented, and
   11. safety means for venting to the atmosphere any leaking oxygen and oxygen-containing mixtures.

2. An oxygen lance comprising
   a lance top adapter assembly,
   a nozzle head, and
   three concentrically positioned pipes including
   a centrally positioned pipe,
   an intermediate pipe, and
   an outer pipe,
   each of said pipes being operatively connected to said lance top adapter assembly and to said nozzle head,
   said lance top adapter assembly including
   1. a bushing member,
   said bushing member being axially spaced apart from said centrally positioned pipe,
   2. a bushing sleeve laterally spaced apart from said bushing member,
   3. a piston sleeve positioned between and in slideable engagement with said bushing member and said bushing sleeve,
   4. means for sealing said piston sleeve and said bushing member against the flow of fluid therebetween,
   5. means for sealing said bushing sleeve and said piston sleeve against the flow of fluid therebetween,
   6. quick disconnect means for quickly and easily removing said lance top assembly from said oxygen lance,
   7. means for sealing said bushing sleeve and said quick disconnect means against the flow of fluid therebetween,
   8. means for feeding cooling fluid into said lance,
   9. means for feeding oxygen into said lance,
   10. means for exiting return cooling fluid from said lance, whereby at least said centrally positioned pipe is axially movable independently of said intermediate and outer pipes and whereby entrainment of the cooling fluid in the oxygen is prevented, and
   11. safety means for venting to the atmosphere any leaking cooling fluid, oxygen, or cooling fluid entrained in the oxygen.

3. The oxygen lance of claim 2 wherein said means for sealing said piston sleeve and said bushing member against the flow of fluid therebetween includes
   an O-ring structure in contact with said piston sleeve and said bushing member.

4. The oxygen lance of claim 2 wherein
   said means for sealing said piston sleeve and said bushing member against the flow of fluid therebetween includes
   an O-ring structure in contact with said piston sleeve and said bushing member and
   said means for sealing said bushing sleeve and said piston sleeve against the flow of fluid therebetween includes
   an O-ring structure in contact with said bushing sleeve and said piston sleeve.

5. The oxygen lance of claim 2 wherein
   said means for sealing said piston and said bushing member against the flow of fluid therebetween includes
   an O-ring structure in contact with said piston sleeve and said bushing member,
   said means for sealing said bushing sleeve and said piston sleeve against the flow of fluid therebetween includes
   an O-ring structure in contact with said bushing sleeve and said piston sleeve, and
   said means for sealing said bushing sleeve and said quick disconnect means against the flow of fluid therebetween includes
   an O-ring structure in contact with said bushing sleeve and said quick disconnect means.

6. The oxygen lance of claim 2 wherein
   said means for feeding oxygen into said lance includes
   a pipe sleeve and a pipe reducer member,
   said pipe sleeve being operatively connected to said bushing member and said pipe reducer member being operatively connected to said pipe sleeve.

7. The oxygen lance of claim 2 wherein
   said centrally positioned pipe is operatively connected to said piston sleeve.

8. The oxygen lance of claim 2 wherein said intermediate pipe and said nozzle head are operatively connected by means of a slip joint structure,
   whereby said centrally positioned pipe and said intermediate pipe are movable independently of each other.

9. The oxygen lance of claim 2 wherein said intermediate pipe and said nozzle head are operatively connected by means of a slip joint structure, and wherein said means for sealing said piston sleeve and said bushing member against the flow of fluid therebetween includes
   an O-ring structure in contact with said piston sleeve and said bushing member,
   whereby said centrally positioned pipe and said intermediate pipe are movable independently of each other.

10. The oxygen lance of claim 2 wherein said intermediate pipe and said nozzle head are operatively connected by means of a slip joint structure, and wherein said means for feeding oxygen into said lance includes
    a pipe sleeve and a pipe reducer member
    said pipe sleeve being operatively connected to said bushing member and said pipe reducer member being operatively connected to said pipe sleeve,
    whereby said centrally positioned pipe and said intermediate pipe are movable independently of each other.

11. The oxygen lance of claim 2 wherein said intermediate pipe and said nozzle head are operatively connected by means of a slip joint structure and said centrally positioned pipe is operatively connected to said piston sleeve, whereby said centrally positioned pipe and said intermediate pipe are movable independently of each other.

12. An oxygen-fuel lance comprising
a lance top adapter assembly,
a nozzle head, and
four concentrically positioned pipes including
a centrally positioned pipe,
a second pipe,
an intermediate pipe, and
an outer pipe,
each of said pipes being operatively connected to said lance top adapter assembly and to said nozzle head,
said lance top adapter assembly including
1. a first bushing member being axially spaced apart from said centrally positioned pipe,
2. a bushing sleeve laterally spaced apart from said first bushing member,
3. a piston sleeve positioned between and in slideable engagement with said bushing member and said bushing sleeve,
4. a second bushing member being axially spaced apart from said bushing sleeve, and laterally spaced apart from said centrally positioned pipe,
5. means for sealing said piston sleeve and said first bushing member against the flow of fluid therebetween,
6. quick disconnect means for quickly and easily removing said lance top assembly from said oxygen-fuel lance,
said quick disconnect means including a pipe body member adjacent to at least a portion of said bushing sleeve,
said second bushing member being in slideable engagement with at least a portion of said pipe body member,
7. means for sealing said bushing sleeve and said piston sleeve against the flow of fluid therebetween,
8. means for sealing said second bushing member and said pipe body member against the flow of fluid therebetween,
9. means for sealing said bushing sleeve and said quick disconnect means against the flow of fluid therebetween,
10. means for feeding cooling fluid into said lance,
11. means for feeding oxygen into said lance,
12. means for feeding fuel into said lance,
13. means for exiting return cooling fluid from said lance,
whereby at least said centrally positioned pipe and said second pipe are axially movable independently of said intermediate pipe and said outer pipe and whereby mixing of the fuel fluid, oxygen and coolant fluid is prevented, and,
14. safety means for venting to the atmosphere any leaking oxygen, fuel fluid or fuel fluid entrained in the oxygen.

13. The oxygen-fuel lance of claim 12 wherein said second bushing member is operatively connected to said second pipe.

14. The oxygen-fuel lance of claim 12 wherein said second bushing member is operatively connected to said second pipe and said piston sleeve is operatively connected to said centrally positioned pipe.

15. The oxygen-fuel lance of claim 12 wherein said means for sealing said piston sleeve and said first bushing member against the flow of fluid therebetween includes
an O-ring structure in contact with said piston sleeve and said first bushing member.

16. The oxygen-fuel lance of claim 12 wherein said means for sealing said piston sleeve and said first bushing member against the flow of fluid therebetween includes
an O-ring structure in contact with said piston sleeve and said first bushing member and
said means for sealing said bushing sleeve and said piston sleeve against the flow of fluid therebetween includes
an O-ring structure in contact with said bushing sleeve and said piston sleeve.

17. The oxygen-fuel lance of claim 12 wherein said means for sealing said piston sleeve and said first bushing member against the flow of fluid therebetween includes
an O-ring structure in contact with said piston sleeve and said first bushing member,
said means for sealing said bushing sleeve and said piston sleeve against the flow of fluid therebetween includes
an O-ring structure in contact with said bushing sleeve and said piston sleeve and
said means for sealing said second bushing member and said pipe body member against the flow of fluid therebetween includes
an O-ring structure in contact with said second bushing member and said pipe body member.

18. The oxygen-fuel lance of claim 12 wherein said means for sealing said piston sleeve and said first bushing member against the flow of fluid therebetween includes
an O-ring structure in contact with said piston sleeve and said first bushing member,
said means for sealing said bushing sleeve and said piston sleeve against the flow of fluid therebetween includes
an O-ring structure in contact with said bushing sleeve and said piston sleeve,
said means for sealing said second bushing member and said pipe body member against the flow of fluid therebetween includes
an O-ring structure in contact with said second bushing member and said pipe body member and
said means for sealing said bushing sleeve and said quick disconnect means against the flow of fluid therebetween includes
an O-ring structure in contact with said bushing sleeve and said quick disconnect means.

19. The oxygen-fuel lance of claim 12 wherein said means for feeding oxygen into said lance includes
a pipe sleeve and a pipe reducer member,
said pipe sleeve being operatively connected to said first bushing member and said pipe reducer member being operatively connected to said pipe sleeve.

20. The oxygen-fuel lance of claim 12 wherein said intermediate pipe and said nozzle head are operatively connected by means of a slip joint structure.

21. The oxygen-fuel lance of claim 12 wherein said second bushing member is operatively connected to said second pipe and wherein said intermediate pipe and said nozzle head are operatively connected by means of a slip joint structure.

* * * * *